United States Patent [19]

Sivak et al.

[11] Patent Number: 5,200,542

[45] Date of Patent: Apr. 6, 1993

[54] DIALLYL SILYL AMINES

[75] Inventors: Andrew J. Sivak, Edgewood Boro; Leonard A. Cullo, Hempfield Township, Westmoreland County; William L. Krayer, Mt. Lebanon Township, Allegheny County all of Pa.

[73] Assignee: Aristech Chemical Corporation, Pittsburgh, Pa.

[21] Appl. No.: 925,133

[22] Filed: Aug. 6, 1992

Related U.S. Application Data

[60] Division of Ser. No. 422,275, Oct. 16, 1989, which is a continuation-in-part of Ser. No. 257,895, Oct. 14, 1988, abandoned, which is a continuation-in-part of Ser. No. 47,960, May 8, 1987, abandoned.

[51] Int. Cl.$^5$ .................................................. C07F 7/10
[52] U.S. Cl. ...................................................... 556/410
[58] Field of Search .......................................... 556/410

[56] References Cited

U.S. PATENT DOCUMENTS

| | | | |
|---|---|---|---|
| 2,926,161 | 2/1960 | Butler et al. | 260/89.7 |
| 3,412,019 | 11/1968 | Hoover et al. | 210/54 |
| 3,580,939 | 5/1971 | Ceyzeriat et al. | 556/410 |
| 4,558,146 | 12/1985 | Kanner et al. | 556/410 |
| 5,030,746 | 7/1991 | Schilling | 556/410 |

FOREIGN PATENT DOCUMENTS 1097163 12/1967 United Kingdom .............. 260/89.7

OTHER PUBLICATIONS

Giannini et al, Polymerization of Nitrogen-Containing and Oxygen-Containing Monomers by Ziegler-Natta Catalysts, J. Polymer Sci.:Part C 22, pp. 157-175, (1968).

Giannini et al, Stereospecific Polymerization of Monomers Containing Oxygen and Nitrogen with Ziegler-Natta Catalysts, Polymer Letters, vol. 5, pp. 527-533, (1967).

*Primary Examiner*—Paul F. Shaver
*Attorney, Agent, or Firm*—William L. Krayer

[57] ABSTRACT

Mono and diallyl amines are silylated to protect them from reacting with high activity Ziegler-Natta catalysts so they may be copolymerized with propylene; copolymers of such amines with propylene and their hydrolyzed or alcholyzed counterparts; also the amine monomers disclosed.

4 Claims, No Drawings

DIALLYL SILYL AMINES

This is a division of application Ser. No. 422,275, filed Oct. 16, 1989 which is a continuation-in-part of our co-pending application Ser. No. 257,895 filed Oct. 14, 1988, now abandoned by two of the inventors herein, which is a continuation-in-part of application Ser. No. 047,960 filed May 8, 1987, now abandoned, by the same two inventors.

TECHNICAL FIELD

This invention relates to copolymers of propylene and other alpha olefins with certain amines having polymerizable unsaturated groups. The invention includes the use of supported Ziegler-Natta catalysts for the copolymerization and methods of inhibiting the attack of the catalysts by the amines during polymerization, through the use of a class of silyl groups attached to the amine nitrogen. Both mono-unsaturated and di-unsaturated polymerizable amines are used. The silyl-modified diallyl amines are believed to be novel.

BACKGROUND OF THE INVENTION

Certain silylated unsaturated amines are known in the prior art. Giannini and his co-workers in 1967 and 1968 synthesized compounds of the structure $CH_2=CH(CH_2)_nNHSi(CH_3)_3$ (Polymer Letters, 5, 527–533 (1967) J. Polymer Sci. Part C, No. 22, pp. 157–175, 1968) and polymerized them using classical Ziegler-Natta catalysts. However, it has not been shown in the prior art (so far as we are aware) how to copolymerize propylene or other alpha olefins with such amines in the presence of highly active contemporary catalysts, i.e., titanium chlorides on magnesium chloride supports and having internal donors such as an alkyl phthalate or esters of aromatic carboxylic acids, to achieve the high molecular weights for which the lower olefin polymers are known. The copolymers so produced are useful for the presence of the amine functional groups covalently attached to or in the polymer backbone; various functions can be placed on the amine groups as will be discussed below.

Diallyl amines have been shown to form linear polymers in aqueous media in spite of their di-unsaturation; see Butler et al U.S. Pat. No. 2,926,161 and Hoover et al U.S. Pat. No. 3,412,019, for example. While diallyl amines and their quaternized counterparts are commonly commercially copolymerized with acrylamide, and are suggested for copolymerization with other acrylic monomers such as lower alkyl acrylates, acrylonitrile, various vinyl and styrenic monomers, it is not believed they have been successfully copolymerized with a lower olefin by use of a Ziegler-Natta catalyst system, which would be expected to be attacked by the amine.

In European Patent Application No. 88900936.1 (see corresponding PCT International Publication No. WO88/08856, Nov. 17, 1988), we (two of us) disclose methods of protecting the oxygen of hydroxyl groups in certain compounds having polymerizable unsaturated groups so the compounds can be used as comonomers with lower olefins. It is also suggested that a similar system of protection can be used for amines having polymerizable unsaturated groups. This application is particularly concerned with copolymerization of lower alpha olefins and amines having ethylenically unsaturated polymerizable groups and protected from reaction with highly active Ziegler-Natta catalysts by the silyl groups defined herein.

SUMMARY OF THE INVENTION

We have invented a series of copolymers of propylene and polymerizable unsaturated amines wherein the amine monomer content is about 0.001% to about 99.999% of the monomers, and methods of making such copolymers. In addition, our invention includes certain silylated di-unsaturated amines. Our invention also includes a method of copolymerizing propylene and amines of the formula $CH_2=CHCH_2NR^4SiR^1R^2R^3$ where $R^1$, $R^2$, and $R^3$ are independently selected from alkyl and aryl groups having from one to about eight carbon atoms and $R^4$ is selected from hydrogen, $CH_2=CHCH_2-$, alkyl groups having from one to twenty carbon atoms and $SiR^1R^2R^3$, wherein propylene and such comonomers are placed in the presence of a catalyst comprising a titanium halide catalyst on a magnesium chloride support and a co-catalyst of trialkyl aluminum (e.g., triethyl aluminum) optionally in the presence of an added external donor such as diphenyl dimethoxy silane, in a ratio of propylene to comonomer of about 0.001 to about 0.999, under conditions commonly used for the polymerization of propylene, i.e., in a hydrocarbon solvent (or liquid monomer) subject to temperatures of about 20° to 100° C. and pressures of 0.1 to 20 atmospheres. The invention includes the copolymers of propylene and amine comonomers having molar ratios of 0.001% to about 99.999% and the corresponding polymers from which the silyl groups have been removed by solvolysis. By solvolysis, we mean either a simple treatment with water or alcohol whereby the silyl group is washed away and replaced by a hydrogen or a more complex treatment with an aqueous, alcohol, or other solution containing a functional moiety other than hydrogen which may be desired on the amine, such as a dye group. In the latter type of treatment, the individual amine may pass through the coordinations with the silyl group, the hydrogen, and the dye or other moiety more or less simultaneously; in any event, the resulting copolymer incorporates functional amine groups. Our invention also includes the diallyl amine monomer of the formula $(CH_2=CHCH_2)_2NSiR^1R^2R^3$, copolymers of it with propylene, and its polymeric derivatives from which the silyl groups have been removed and replaced with hydrogen.

While we include wide ratios of propylene to amine as stated above, for many purposes such as dying, a preferred range of copolymers has about 0.01% to about 50% amine monomers (as a percent of the monomer units in the polymer) and more preferably about 0.05% to about 5%.

DETAILED DESCRIPTION OF THE INVENTION

Example 1

Following is a description of the preparation of a copolymer of propylene and trimethylsilyl diallyl amine and propylene: a 100 ml Ar purged flask was sequentially charged with propylene (Ar purge replaced with propylene purge), 7.4 g trimethyl silyl diallyl amine, 5.0 ml of 25% TEA solution in heptane, 5.0 ml n-heptane and 772 mg of FT-1-SS. Within 2 minutes, the flask was hot to the touch and propylene consumption was rapid. Reaction temperature was moderated with a cool water bath. After 1.5 hours, another 322 mg of solid co-catalyst was added to the reaction mixture. After a further hour, 4.0 ml n-heptane were added. After a further 20 minutes, the reaction was quenched with acidified methanol. Solids were washed with methanol/water, methanol/water/HCl, methanol/water/HCl, methanol/water/KOH and finally methanol until the wash liquid tested pH 7–6. The reaction product was shown to be the desired copolymer by demonstrating its affinity for the acidic dye Acid Alizarin BB as shown by a permanent coloration after treatment with the dye by visual inspection and comparison with homopolypropylene which did not pick up the dye under the same conditions of simple contact. No attempt was made to determine the extent, if any, of cross-linking, or of unsaturation in the polymer.

Examples 2–11

In these examples, triethyl silyl diallyl amine was used as the comonomer under the conditions shown in Table I with propylene. Heptane was used as the solvent DPMS as modifier; the reaction was conducted for two hours at 50° C. under an atmosphere of propylene. The molar concentrations of monomer, aluminum co-catalyst concentration, and yields of copolymer are shown in Table I, in which "M-1" is the amine comonomer and "M-2" is propylene. All analyses were performed after solvolysis.

Examples 12–17

In these examples, bis(trimethylsilyl) allyl amine was used as the comonomer under conditions similar to those of Examples 2–11. Results are shown in Table II in a format similar to that of Table I.

TABLE II

| RUN NO. | COPOLYMER COMPOSITION MOLE % M-1 | COPOLYMER COMPOSITION MOLE % M-2 | POLYMERIZATION CONDITIONS TOTAL VOL (ml) | M-1 CONC (m/l) | Al CONC (m/l) | MOD CONC (m/l) | CAT CONC (mg/ml) | YIELD (g) | RATIOS Al/M-1 | Al/mod | Al/Si |
|---|---|---|---|---|---|---|---|---|---|---|---|
| 385 | <0.3 <0.3 | 100.3 | 88.28 | 0.63 | 0.37 | 0.01 | 2.07 | 3.8 | 0.59 | 19.6 | 0.57 |
| 381 | <0.3 0.3 | 100.3 | 135.09 | 0.13 | 0.06 | 0.00 | 1.89 | 13.7 | 0.48 | 19.5 | 0.47 |
| 369 | <0.1 | 100.3 | 135.35 | 0.12 | 0.06 | 0.00 | 1.04 | 20.0 | 0.49 | 19.5 | 0.48 |
| 384 | <0.4 <0.4 | 100.34 | 71.30 | 0.50 | 0.24 | 0.01 | 3.49 | 5.5 | 0.48 | 19.6 | 0.47 |
| 372 | <0.3 1.1 | 98.89 | 62.14 | 0.23 | 0.19 | -0.01 | 4.39 | 12.5 | 0.82 | 19.6 | 0.79 |
| 370 | <0.3 1.0 | 99.0 | 138.96 | 0.12 | 0.10 | 0.00 | 1.66 | 23.2 | 0.8 | 19.5 | 0.77 |

Because of the difficulty of elemental analysis for nitrogen, a second series of analyses were performed on the reaction products described in Tables I and II, with the results shown in Tables I and II as the second entries under Mole % M-1. For comparison purposes here and in the dyeing experiments to be mentioned, Table III ranks the copolymerizations in order of increasing comonomer concentration present during polymerization.

Our explanation/rationalization of these results is that the elemental analysis of nitrogen must indeed be defective/difficult.

TABLE III

| RUN NO. | ALLYL AMINE RUNS COMONOMER CONCENTRATION |
|---|---|
| 370 | 0.122 |
| 369 | 0.123 |
| 381 | 0.125 |
| 372 | 0.229 |
| 384** | 0.495 |
| 385 | 0.628 |

| RUN NO. | DIALLYL AMINE RUNS COMONOMER CONCENTRATION |
|---|---|

TABLE I

| RUN NO. | COPOLYMER COMPOSITION MOLE % M-1 | COPOLYMER COMPOSITION MOLE % M-2 | POLYMERIZATION CONDITIONS TOTAL VOL (ml) | M-1 CONC (m/l) | Al CONC (m/l) | MOD CONC (m/l) | CAT CONC (mg/ml) | YIELD (g) | RATIOS Al/M-1 | Al/mod | Al/Si |
|---|---|---|---|---|---|---|---|---|---|---|---|
| 357 | <0.3 0.5 | 99.5 | 78.18 | 0.68 | 0.31 | 0.02 | 2.62 | 7.83 | 0.45 | 19.6 | 0.44 |
| 354 | 0.4 0.8 | 99.2 | 95.70 | 0.39 | 0.18 | 0.01 | 2.79 | 16.07 | 0.47 | 19.6 | 0.46 |
| 351 | 0.5 0.5 | 99.5 | 116.87 | 0.27 | 0.12 | 0.01 | 1.99 | 13.82 | 0.46 | 19.5 | 0.45 |
| 343 | 0.5 0.7 | 99.3 | 135.00 | 0.14 | 0.06 | 0.00 | 2.13 | 27.72 | 0.44 | 19.6 | 0.43 |
| 359 | <0.3 <0.3 | 100.3 | 117.39 | 0.34 | 0.73 | 0.04 | 1.01 | 8.69 | 1.87 | 19.6 | 1.7 |
| 355 | <0.3 0.9 | 99.1 | 103.63 | 0.39 | 0.28 | 0.01 | 2.23 | 13.00 | 0.71 | 19.6 | 0.68 |
| 356 | <0.3 0.7 | 99.3 | 81.16 | 0.27 | 0.49 | 0.02 | 2.98 | 11.45 | 1.79 | 19.6 | 1.64 |
| 352 | <0.3 0.8 | 99.2 | 122.76 | 0.27 | 0.18 | 0.01 | 0.75 | 11.92 | 0.69 | 19.6 | 0.67 |
| 345 | <0.3 1.1 | 98.9 | 131.85 | 0.14 | 0.03 | 0.00 | 2.86 | 22.59 | 0.22 | 19.5 | 0.22 |
| 344 | <0.3 0.6 | 99.4 | 137.75 | 0.14 | 0.09 | 0.00 | 1.78 | 18.98 | 0.66 | 19.5 | 0.63 |

TABLE III-continued

| | |
|---|---|
| 345 | 0.137 |
| 344 | 0.141 |
| 343 | 0.143 |
| 351 | 0.267 |
| 352 | 0.268 |
| 356 | 0.272 |
| 354 | 0.387 |
| 355 | 0.391 |
| 359 | 0.391 |
| 357 | 0.676 |

**See the discussion of dyeing results below.

Dyeing was used as another method of characterizing these materials and distinguishing them from homopolypropylene.

Three groups of these copolymers were subjected to acid dyes under varying sets of conditions.

| | |
|---|---|
| Group 1: | |
| Polymers from run nos.: | 347 (homopolypropylene for comparison), 344, 345, 384, and 372. |
| Conditions: | 2% Acid Phloxine Green (CI No. 16570) in water; 1 g polymer in 25 ml dye bath; 2 h at 80–90° C.; filtered, washed with isopropanol (40 ml), 20 ml 2% soap solution at 70° C., 40 ml distilled water, vacuum dried. |
| Results: | Blind ranking of dyed polymer |
| Person | least colored → most colored |
| RJS | 347, 344=345, 372, 384 |
| MKH | 347, 344=345, 372, 384 |
| AJS | 347, 345=344, 372, 384 |
| Group 2: | |
| Polymers from run nos.: | 347 (homopolypropylene), 343, 345, 384, and 370. |
| Conditions: | 2% Tartrazine in water; 1 g polymer in 20 ml dye bath and 5 ml isopropanol; 2 h at 75–90° C.; filtered, washed with 30 ml 2% soap solution at 70° C., 40 ml distilled water twice, vacuum dried. |
| Results: | Blind ranking of dyed polymer. |
| Person | least colored → most colored |
| RJS | 347, 345=343, (=)370, 384 |
| MKH | 347, 344=345, 370, 384 |
| AJS | 347, 345=344, (=)370, 384 |
| Group 3: | |
| Polymers from run nos.: | 347 (homopolypropylene), 343, 345, 381, 384, 370, 372, and 385. |
| Conditions: | 2% Acid Alizarin Blue in water; 1 g polymer in 10 ml dye bath and 10 ml isopropanol; 6 h at room temperature; filtered, washed with 50 ml 1% soap solution at 70° C., 40 ml distilled water twice, vacuum dried. |
| Results: | Blind ranking of dyed polymer. |
| Person | least colored → most colored |
| RJS | 347, 381, 345=372, 370, 385, 343, 384 |
| MKH | 347, 381, 345, 372=340, 385, (=)343, 384 |
| AJS | 347, 381, 345=372, 370, 385=343, 384 |

The net results of ranking the dyed polymers from these three groups is the following:

Homopolypropylene was always ranked lowest in color uptake. It always appeared "undyed." If there was color present it was never the same color as the dye or other "dyed" polymer samples. This confirms our expectation that homopolymer and catalyst residue will not account for coloration if it is found.

This also implies that copoly(di)allyl amine/propylenes are formed and do take up acid dyes.

For the diallyl amine containing copolymers the order of ranking of dyed material is $$344 < = 345 < = 343$$

where "$< =$" is read "less than or about equal." The procedure required the polymers to be ranked but if it was felt that there was no real difference in color, this was to be specified. This means that these three polymer samples were found to be all about equally dyed. The concentrations of amine during the copolymerizations were (from Table III)

$$0.141, 0.137, 0.143$$

molar, respectively. Thus, one should expect that the polymers should have about the same amount of comonomer incorporated which in turn would lead one to expect about the same degree of dye uptake. This was empirically observed.

For the allyl amine containing polymers, the order of ranking of the dyed material is $$381 < 372 < = 370 < 385 < \{384\}$$

The concentrations of amine during the copolymerizations were (from Table III)

$$0.125, 0.229/0.122, 0.628, \{0.48\},$$

respectively.

Before further discussion, the case of polymer from run 384 must be commented upon. The behavior of this material was unique. The dyeing proceeded to 100% exhaustion of the dye bath with the result that all of the dye put into the dye bath went into the polymer. Without a doubt 384 polymer was the most intensely colored sample. The elemental analysis shows, however, that 15–20% of this material is unaccounted for by C, H, and N. One determination of ash after combustion found it to be 7.28%. At present, these anomalous results are unexplained and this sample may not be considered valid.

Though the results for the allyl amines are not as straightforward as in the diallyl amine case, it appears that dye uptake more or less follows expected comonomer incorporation as might be expected from comonomer concentration.

That amine comonomer was in fact incorporated into the copolymer was further demonstrated by 'Hnmr spectroscopy of the copolymer. Polymer from dianyl runs 344, 354, 355, and 357 were examined by "Hnmr at 300 MHz at 110° C. in $C_2D_2Dl_4$ with HMDS internal reference. Resonances absent in homopolypropylene were detected 5.79, 5.69, 5.15, 4.62, 4.20, and 3.97. Run 385, employing the monoallyl amine, showed a broad doublet at 7.28, and peaks at 5.25, 4.65, 4.18, and 3.85. The polymers are in fact amine containing copolymers.

The Ziegler-Natta catalysts we employ in our polymerization reactions are those utilizing components aluminum triethyl or other trialkyl aluminum, a titanium chloride on a magnesium chloride support, an internal donor which may typically be phthalate or monocarboxylic aromatic acid esters, and optionally an external donor such as diphenyl dimethoxy silane. Any other of the contemporary ("high yield") catalysts used commercially for the polymerization of propylene may be used, which is the significant point—such catalysts would normally be attacked by the allyl and diallyl amines. With our silyl protecting groups, however, they are inhibited from such attack and accordingly the amines are incorporated into a polymer otherwise similar to homopolymer polypropylenes.

Preferred silyl groups include trimethyl silyl, triethyl silyl and triisopropyl silyl. These and the other silyl groups included in the generic formula above may be attached to the allyl or diallyl amine by the usual methods.

We claim:
1. Trimethyl silyl diallyl amine.
2. Triethyl silyl diallyl amine.
3. Triisopropyl silyl diallyl amine.
4. A compound of the formula $(CH_2=CHCH_2)_2NSiR^1R^2R^3$ wherein $R^1$, $R^2$, and $R^3$ are independently selected from alkyl and aryl groups having one to about eight carbon atoms.

* * * * *